(12) United States Patent
Oostdijk et al.

(10) Patent No.: US 12,328,580 B2
(45) Date of Patent: Jun. 10, 2025

(54) NFC-CHIP READER

(71) Applicant: INNOVALOR B.V., Enschede (NL)

(72) Inventors: Martijn Diederik Oostdijk, Weirden (NL); Tom Nicolaas Van Wietmarschen, Enschede (NL); Wilhelmus Noort, Enschede (NL); Maarten Wegdam, Borne (NL)

(73) Assignee: INNOVALOR B.V., Enschede (NL)

( * ) Notice: Subject to any disclaimer, the term of this patent is extended or adjusted under 35 U.S.C. 154(b) by 125 days.

(21) Appl. No.: 16/629,109

(22) PCT Filed: Jul. 27, 2018

(86) PCT No.: PCT/EP2018/070442
§ 371 (c)(1),
(2) Date: Jan. 16, 2020

(87) PCT Pub. No.: WO2019/025312
PCT Pub. Date: Feb. 7, 2019

(65) Prior Publication Data
US 2020/0169889 A1 May 28, 2020

(30) Foreign Application Priority Data
Jul. 31, 2017 (EP) .................................... 17184076

(51) Int. Cl.
*H04W 12/10* (2021.01)
*H04L 9/08* (2006.01)
(Continued)

(52) U.S. Cl.
CPC ......... *H04W 12/108* (2021.01); *H04L 9/0838* (2013.01); *H04L 9/3271* (2013.01); *H04W 12/106* (2021.01); *G06F 2221/2103* (2013.01)

(58) Field of Classification Search
None
See application file for complete search history.

(56) References Cited

U.S. PATENT DOCUMENTS

2015/0193870 A1* 7/2015 Spielman ............... G06Q 40/03 705/51
2017/0038807 A1* 2/2017 Bittlestone .............. G06F 21/73
(Continued)

FOREIGN PATENT DOCUMENTS

WO WO-2015179507 A1 * 11/2015 ............. G06F 21/33
WO 2016019127 A1 2/2016

OTHER PUBLICATIONS

Dagdelen et al. "Security Analysis of the Extended Access Control Protocol for Machine Readable Travel Documents" International Conference on Financial Cryptography and Data Security; vol. 6531 Chap.6, pp. 54-68; Oct. 25, 2010.
(Continued)

*Primary Examiner* — Benjamin E Lanier
(74) *Attorney, Agent, or Firm* — Maschoff Brennan

(57) ABSTRACT

Near field communication (NFC) is used for banking, access control or identification. The NFC-chip contains data verifying the identity of the holder, which is read by an NFC-chip reader. NFC-chip readers are now often online or stand-alone terminals, which may be trusted or untrusted. Trusted terminals may require a communication link to a certificate server. Untrusted terminals require a link to a server that performs the authentication steps and may require a link to a certificate server. A disadvantage of conventional NFC-chips and readers is that it can be challenging to position NFC-chip readers at remote or other arbitrary locations. A solution is found in a method for communication with an NFC-chip of a user identification document, by which a terminal obtains protected data from the NFC-chip, including the step of verifying the integrity of the protected data; and a server verifies genuineness of the NFC-chip communicating via the terminal.

10 Claims, 7 Drawing Sheets

(51) Int. Cl.
*H04L 9/32* (2006.01)
*H04W 12/106* (2021.01)
*H04W 12/108* (2021.01)

(56) References Cited

U.S. PATENT DOCUMENTS

2018/0160294 A1* 6/2018 Lee .................. H04W 8/183
2018/0351945 A1* 12/2018 Li ................... H04W 8/205

OTHER PUBLICATIONS

Bundesamt Für Sicherheit In Der Informationstechnik "Advanced Security Mechanisms for Machine Readable Travel Documents and eIDAS Token—Part 1—eMRTDs with BACIPACEv2 and EACv1" Version 2.20; Feb. 26, 2015.
"German eID based on Extended Access Control v2 Overview of the German eID system" Version 1.0; Feb. 20, 2017; Federal Office for Information Security.
Morgner et al. "Securing Transactions with the eIDAS Protocols", Springer International Publishing Switzerland 2016, WISTP 2016, LNCS 9895, 2016, pp. 3-18.
ICAO, "Doc 9303, Machine Readable Travel Document, 7th edition 2015, Part 11—Security Mechanisms for MRTDs", 124 pgs.

* cited by examiner

NFC-CHIP READER

FIELD OF THE INVENTION

The invention relates to the field of communication with NFC-chips. The invention further relates to the field of terminals communicating with NFC-chips. The invention further relates to the field of servers communicating with NFC-chips. The invention further relates to the field of computer program products for communicating with NFC-chips.

BACKGROUND OF THE INVENTION

Near field communication (NFC) is used for banking, access control or identification. Examples of user identification documents containing an NFC-chip are bank cards, credit cards, access cards, driving licenses, passports, ID cards. The NFC-chip contains data verifying the identity of the holder. The data on an NFC-chip may be read by an NFC-chip reader, such as a bank terminal, boarder control gate, access controlled gate or hand terminal.

The data on the NFC-chip typically contains private information, which should only be accessible to NFC-chip readers having permission to read this information. Several checks could be in place to verify the permission of the NFC-chip reader. One of those checks is that the NFC-chip reader has to be able to acquire a key based on an optical identifier printed on the user identification document such as, for example, the machine-readable zone (MRZ), a Card Access Number (CAN) or a bar- or QR code from the user identification document. This identifier contains a key necessary for unlocking the data on the NFC-chip.

The other way around, the user identification document is also checked by the NFC-chip reader. The following sequence typically unfolds:

visually obtain key from document;
gain access to protected data;
active authentication or chip authentication;
read protected data with key; and
passive authentication.

The correctness of the protected data is verified during passive authentication. Part of the protected data contains a digital signature. The digital signature is based on the rest of the protected data and a certificate from a certifying authority. The NFC-chip reader uses this digital signature to verify the correctness of the protected data against a list of trusted certificates of the issuing countries.

After the correctness of the protected data is verified, active or chip authentication verifies that the original NFC-chip is communicating with the NFC-chip reader and not a clone of the NFC-chip. Thus, active or chip authentication prevents cloning of the NFC-chip. Active or chip authentication is based on a public-private key combination on the NFC-chip and a challenge from the NFC-chip reader requiring the correct response to the NFC-chip reader.

Further readings on communication with a user identification document containing a NFC-chip may be found in ISO/IEC 18013-3, part 3, first edition 2009-03-01; DOC9303, Machine Readable Travel Documents, seventh edition 2015 and TR-03110-1 Advanced Security Mechanisms for Machine Readable Travel Documents and eIDAS Token, version 2.20, 26 Feb. 2015.

A development is seen wherein the NFC-chip reader evolves towards a system comprising an online or stand-alone terminal. For example, a smartphone may be used as NFC-chip reader. Depending on the requirements and environment wherein the terminal is operated, this terminal may be trusted or untrusted. If the terminal is trusted, the terminal may require a communication link to a certificate server or may store the certificates locally. If the terminal is untrusted, the terminal requires a link to a server performing all the authentication steps. This server in turn may require a link to a certificate server or may store the certificates locally.

A disadvantage of the conventional NFC-chips and NFC-chip readers is that it can be challenging to position NFC-chip readers at arbitrary locations, such as a remote location. A known solution may be to use a smartphone as NFC-chip reader. Although this is a solution to the arbitrary location problem, when the smartphone is used as NFC-chip reader, complex local security measures are required to protect the smartphone against hacking or other security threats, making the use of the smartphone as NFC-chip reader complex. Thus, a trusted randomly locatable terminal has the disadvantage of requiring complex security measures.

Another known solution is to have an NFC-chip transceiver and a trusted server with a network link in between and located at a distance from the transceiver. It is known that the protocol specification defining the communication between the NFC-chip and NFC-chip reader allows only for small timeouts. As the server is located at a distance from the transceiver, a high speed, low jitter and low round trip time link between the NFC-chip transceiver and the server is required to meet the timeout requirements. Thus, an NFC-chip reader having an NFC-chip transceiver and a trusted server has the disadvantage of requiring a high-quality and thus complex network link between the NFC-chip transceiver and the trusted server.

SUMMARY OF THE INVENTION

An objective of the invention is to provide a more robust NFC-chip reader.

According to a first aspect of the invention, a method for communication with an NFC-chip of a user identification document, comprising the steps of: a terminal obtaining protected data from the NFC-chip, wherein obtaining comprises the step of verifying the integrity of the protected data; and a server verifying genuineness of the NFC-chip communicating via the terminal.

It is an insight of the inventor that active authentication and passive authentication may be split to obtain a terminal, which is trusted to do access control and clone-detection protocol execution, but untrusted for active authentication and passive authentication.

The method according to the current invention provides the advantage of splitting the NFC-reader in a partially trusted terminal and a fully trusted server. Thus, the method according to the invention allows either for a simpler implementation of local security measures or for a simpler link between terminal and server or both. Hence, the method or communication with an NFC-chip of a user identification document according to the current invention allows for a simpler system.

As the terminal is partially trusted, the terminal may be a hand-held device, such as a smartphone, with minimal or no extra security measures.

In an embodiment of the method, the step of verifying genuineness is initiated before completing the obtaining step.

It is an insight of the inventor that the active authentication is computational expensive and relative to the other communication steps requires providing considerable power to the NFC-chip. Furthermore, it is an insight that the radio on the NFC-chip also requires considerable power. Thus, if the active authentication is delayed, the radio of the NFC-chip may deplete its energy source and consequently active authentication will fail.

It is a further insight that steps for active authentication may already be undertaken before passive authentication or reading protected data has completed.

The method according to this embodiment provides the advantage of minimizing the influence of jitter and/or delay on a network either between the chip and terminal or between the terminal and the server. This in turn prevents any disruptions to occur between the NFC-chip and terminal while communicating. These disruptions may be protocol timeouts or energy source depletion. Hence, the reliability of the communication between the NFC-chip and the terminal is enhanced, without compromising the reliability of the verification for unreliable terminals.

In an embodiment of the method, the step of obtaining protected data comprises the steps of: the terminal obtaining an access key from the user identification document; and the terminal using the access key for activating the NFC-chip for transferring the protected data to the terminal.

In an embodiment of the method, the verifying genuineness step comprises the steps of: the terminal receiving a challenge from the server; the terminal transmitting the challenge to the NFC-chip; and the terminal forwarding the challenge response from the NFC-chip to the server; wherein the receiving step is independent in time of the transmitting step. This method allows for the terminal to have a storage, such as a queue, of challenges. This storage may be used to directly transmit a challenge from the terminal and to the NFC-chip when the communication channel between the NFC-chip and the terminal is available. Having the challenges available minimizes the influences of jitter and delays in a network connected to the terminal. Typically, the challenge is sent directly after reading the protected data or completing passive authentication communication between NFC-chip and terminal. This type of use of a challenge may be labelled active authentication.

In a further embodiment of the method, each challenge is associated with a time-to-live (TTL) period. The TTL period determines how long a challenge is valid, providing the advantage of improved security as the challenge may not be used after a certain time period.

In a further embodiment of the method, each challenge is associated with a session identifier. The session identifier simplifies identification of the challenge, such as in a database, and prevents reuse of the challenge.

In an embodiment of method, the verifying genuineness step comprises the steps of: the terminal forwarding a public key from a keypair on the NFC-chip to the server for basing a challenge on the public key; a terminal receiving the challenge and a public key from a server keypair from the server; the terminal transmitting the challenge and that server public key to the NFC-chip; and the terminal forwarding a response (to the challenge) from the NFC-chip to the server, wherein the response (to the challenge) is based on a shared key based on the server public key and a chip private key of the chip's keypair. As this sequence of steps requires the use of a public key, these steps may be initiated directly after the terminal receives the chip's public key from the NFC-chip. As the chip's public key is typically received before reading the protected data is completed, any influence of the network between the terminal and server is minimized or even eliminated. This type of use of a challenge may be labelled chip authentication.

In a further embodiment of the method, the challenge is an encrypted command. The command is encrypted by the server with the shared secret shared between the terminal and the NFC-chip. The shared secret is based on the public-private key pair of the chip and the public-private key pair of the server. Typically, this shared secret is based on a Diffie-Hellman or on a ElGamal key exchange scheme. Typically, the public-private key pair of the chip is static. Typically, the public-private key pair of the server is ephemeral. As the command is encrypted, only the NFC-chip may decrypt the command. In response, the NFC-chip encrypts the command response with the shared secret. The encrypted command response can only be decrypted by the server by the server. Further, the server may evaluate the validity of the command response.

In an embodiment of the current invention, the terminal and server may be combined in one physical device. This providing the advantage of minimizing the influence of jitter and/or delay on a network either between the terminal and the server or between terminal or server and a certificate server.

According to another aspect of the invention, a method for a terminal communicating with an NFC-chip of a user identification document, comprising the steps of: obtaining protected data from the NFC-chip; and forwarding communication between the NFC-chip and a server for verifying genuineness of the NFC-chip. As the terminal executing the method does not verify the genuineness of the NFC-chip, the implementation of the terminal becomes simpler. The method according to the current invention provides the advantages as described above. The terminal may receive a signal from the server comprising the result of the genuineness test.

In an embodiment of the current invention, the step of forwarding is initiated before completing the obtaining step. It will be obvious to the reader that obtaining the protected data may comprise the step of reading the protected data and verifying the protected data, such as authenticating the protected data with a digital signature. The method for the terminal minimizes the influence of jitter and/or delay on a network either between the terminal and the server or between terminal or server and a certificate server. The method according to the current invention provides the advantages as described above.

In an embodiment of the current invention, the step of obtaining protected data comprises the steps of: obtaining an access key from the user identification document; and using the access key for activating the NFC-chip for transferring the protected data. This provides the advantage of restricting access to protected data on the NFC-chip with an access key. Preferably, this key is available via a machine-readable zone (MRZ) on the user identification document. More preferably, this MRZ is an inner page of the user identification document.

In an embodiment of the current invention, the forwarding step comprises the steps of: receiving a challenge from the server; transmitting the challenge to the NFC-chip; and forwarding the challenge response from the NFC-chip to the server; wherein the receiving step is independent in time of the transmitting step. This method for the terminal allows for the terminal to have a storage, such as a queue, of challenges, providing the advantages as described above. In a further embodiment of the method, each challenge is associated with a time-to-live (TTL) period. In a further embodiment of the method, each challenge is associated with a session identifier.

In an embodiment of the current invention, the forwarding step comprises the steps of: forwarding a public chip key from a key chip pair on the NFC-chip to the server for basing a challenge on the public chip key; receiving the challenge and a public server key from a key server pair from the server; transmitting the challenge and the public server key to the NFC-chip; and forwarding the challenge response from the NFC-chip to the server, wherein the challenge response is based on a shared key based on the public server key and a private chip key of the chip pair. This embodiment provides the same advantages as described above. In a further embodiment of the method, the challenge is an encrypted command.

According to another aspect of the invention, a method for a server verifying genuineness of a user identification document comprising an NFC-chip, comprising the steps of: tracking the challenges provided by the server to a terminal communicating with the NFC-chip; receiving a challenge response to a challenge from the server from the terminal; verifying genuineness of the NFC-chip based on the challenge response and the challenge; and providing newly generated challenges to the terminal based on the tracking step. The method according to the current invention provides the advantages as described above.

In an embodiment of the current invention, the providing and tracking steps are independent of the receiving and verifying steps. This provides the advantage of relaxing the requirements for either local security measures or link between terminal and server or both. Due to this relaxing, protocol timeouts and/or energy depletion will happen less frequently. Hence, the reliability of the communication between the NFC-chip and the terminal is enhanced and thus the verification. This type of use of a challenge may be labelled active authentication.

According to another aspect of the invention, a method for a server verifying genuineness of a user identification document comprising an NFC-chip, comprising the steps of: receiving a copy of protected data on the NFC-chip; verifying the protected data with a digital signature comprised in the protected data; receiving a public chip key from a key chip pair on the NFC-chip for basing a challenge on the public chip key; transmitting the challenge and a public server key from a key server pair from the server; and receiving a challenge response from the NFC-chip, wherein the challenge response is based on a shared key based on the public server key and a private chip key of the chip pair, wherein the step of receiving the public chip key is initiated before the step of verifying the protected data. This provides the advantage of relaxing the requirements for either local security measures or link between terminal and server or both. Due to this relaxing, protocol timeouts and/or energy depletion will happen less frequently. Hence, the reliability of the communication between the NFC-chip and the terminal is enhanced and thus the verification. This type of use of a challenge may be labelled chip authentication.

According to another aspect of the invention, a terminal comprising: a communication unit configured for communicating with a server verifying genuineness of an NFC-chip of a user identification document; a transceiver configured for communicating with the NFC-chip; and processing means configured for obtaining protected data of the NFC-chip and forwarding communication between the NFC-chip and the server, wherein communication is forwarded before obtaining the protected data is completed. The terminal according to the current invention provides the advantages as described above. The terminal may be configured further to execute any of the steps of the methods described above.

In an embodiment of the current invention, a terminal comprises a challenge storage configured for temporarily storing a challenge on the terminal, which challenge is used for determining the genuineness of the NFC-chip. The storage may be a queue. The terminal according to the current invention provides the advantages as described above.

According to another aspect of the invention, a server comprises a challenge storage configured for tracking challenges associated with a terminal; a verification unit configured for verifying genuineness of an NFC-chip based on a challenge response and the associated challenge from the challenge storage. The storage may be a queue. The challenges may thus be generated before there is a need for during the communication between the NFC-chip and the terminal. The challenge storage may provide challenges independent of the verification unit. The challenge storage may generate challenges, at least upon generation, associated with a terminal, which challenge is not associated with an NFC-chip or communication between an NFC-chip and a terminal. The server according to the current invention provides the advantages as described above. The server may further be configured to execute any of the steps of the methods described above.

According to another aspect of the invention, a server comprises a protected data storage configured for storing a received copy of protected data on an NFC-chip of a user identification document; a signature verification unit configured for verifying the protected data using a digital signature comprised in the protected data; a challenge generator configured for generating a challenge based on a public chip key from a key chip pair on the NFC-chip; a verification unit configured for verifying genuineness of the NFC-chip based on a challenge response and the associated challenge. The server according to the current invention provides the advantages as described above. The server may further be configured to execute any of the steps of the methods described above.

According to another aspect of the invention, a computer program product comprises a computer readable medium having computer readable code embodied therein, the computer readable code being configured such that, on execution by a suitable computer or processor, the computer or processor is caused to perform the method of any of the preceding embodiments. This may be a method for a terminal, a server or a combination.

BRIEF DESCRIPTION OF THE DRAWINGS

The invention will be apparent from and elucidated further with reference to the embodiments described by way of example in the following description and with reference to the accompanying drawings, in which.

The figures are purely diagrammatic and not drawn to scale. In the figures, elements which correspond to elements already described may have the same reference numerals.

LIST OF REFERENCE NUMERALS

Figure 1:
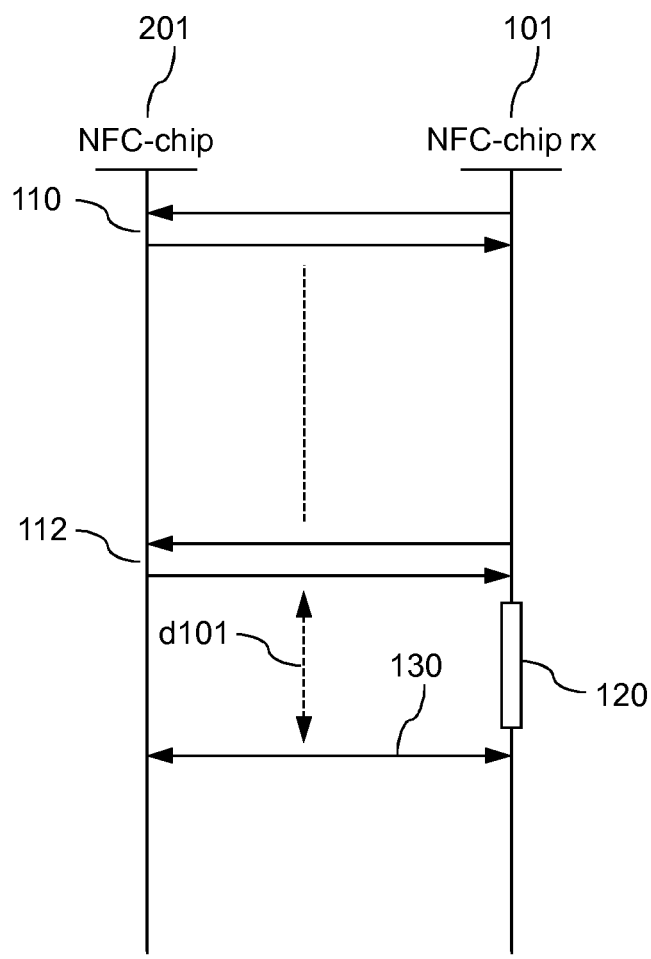
FIG. 1 schematically shows a sequence diagram according to the prior art.

| | |
|---|---|
| 100 | sequence diagram according to the prior art |
| 101 | NFC-chip reader according to the prior art |
| 110 | initiate reading protected data communication |
| 112 | completion reading protected data communication |
| 120 | generating challenge |
| 130 | communication for clone detection |
| 200 | second sequence diagram |
| 201 | NFC-chip |
| 202 | terminal |
| 203 | server |
| 210 | initiate reading protected data communication |
| 212 | completion reading protected data communication |
| 230, 240 | clone detection communication |
| 300 | third sequence diagram |
| 330 | request amount of outstanding challenges |
| 331 | reply amount of outstanding challenges |
| 332 | request new challenge |
| 333 | provide new challenge |
| 340 | challenge from terminal to NFC-chip |
| 341 | challenge response from NFC-chip to terminal |
| 342 | challenge response from terminal to server |
| 400 | fourth sequence diagram |
| 411 | public chip key from NFC-chip to terminal |
| 430 | public chip key from terminal to server |
| 431 | public server key and challenge from server to terminal |
| 440 | public server key and challenge from terminal to NFC-chip |
| 441 | challenge response from NFC-chip to terminal |
| 445 | challenge response from terminal to server |
| 446 | confirmation genuineness NFC-chip |
| 500 | method for a terminal |
| 510 | obtaining protected data |
| 520 | forwarding communication |
| 600 | method for a server |
| 610 | tracking challenges |
| 615 | receiving challenge response |
| 620 | verifying genuineness |
| 625 | providing generated challenge |
| 650 | method for a server |
| 660 | receiving protected data |
| 665 | verifying protected data |
| 670 | receiving chip public key |
| 675 | transmitting challenge and server public key |
| 680 | receiving challenge response |
| 710 | transceiver |
| 715 | NFC-chip - terminal communication |
| 720 | processing means |
| 725 | forwarded communication |
| 730 | communication unit |
| 750 | NFC communication |
| 760 | terminal - server communication |
| 810 | communication unit |
| 815 | challenge communication |
| 820 | challenge storage |
| 825 | challenge response |
| 830 | verification unit |
| 835 | associated challenge |
| 861 | received protected data |
| 865 | protected data storage |
| 866 | protected data |
| 870 | signature verification unit |
| 871 | public key NFC-chip |
| 875 | challenge generator |
| 8760 | challenge transmission |
| 900 | non-transitory computer readable storage medium |
| 910 | writable part |
| 920 | computer program |
| d101 | delay sequence diagram prior art |
| d201 | first delay second sequence diagram |
| d202 | second delay second sequence diagram |
| d301 | first delay third sequence diagram |
| d302 | second delay third sequence diagram |
| d401 | first delay fourth sequence diagram |
| d402 | second delay fourth sequence diagram |

DETAILED DESCRIPTION OF EXEMPLARY EMBODIMENTS

The following figures may detail different embodiments.

FIG. 1 schematically shows a sequence diagram 100 according to the prior art. In a sequence diagram, time progresses from top to bottom. The sequence diagram according to the prior art comprises, as actors, an NFC-chip 201 and an NFC-chip reader 101.

The NFC-chip and NFC-chip reader initiate communication 110 for reading of the protected data of the NFC-chip. The communication continues up to completion of the communication 112 reading the protected data of the NFC-chip. After completion of the communication of reading protected data, the prior art NFC-chip reader processes the received protected data, thereby generating a challenge 120. After generating the challenge, the challenge and response on the challenge are used for genuineness verification or clone detection 130.

The generating of the challenge between the completion of the communication 112 and the start of the clone detection communication 130 causes a delay d101. This delay may disrupt the working of or communication to the NFC-chip. For example, the NFC-chip may run out of energy due to the relative long delay. As another example, the NFC-chip may time-out, due to the delay being too long, which will cause a protocol time-out on the NFC-chip.

Figure 2:
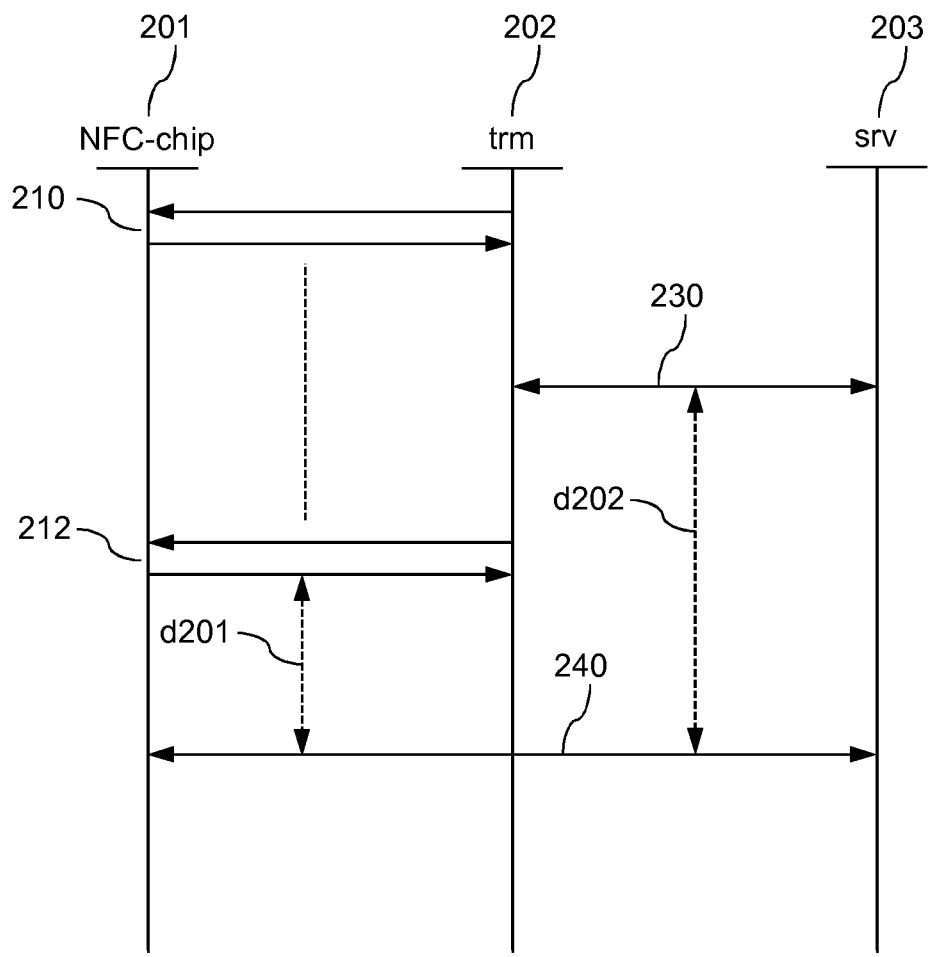
FIG. 2 schematically shows a sequence diagram according to an embodiment of the current invention.

FIG. 2 schematically shows a sequence diagram 200 according to an embodiment of the current invention. The sequence diagram comprises an NFC-chip 201, a terminal 202 and a server 201 according to the current invention as actors.

The terminal and the NFC-chip communicate wirelessly with each other. This communication is labelled NFC-communication. The terminal initiates 210 reading of the protected data from the NFC-chip. The terminal completes 212 reading of the protected data from the NFC-chip after some time. Clone detection communication 230 between the terminal and the server starts before the reading of the protected data completes 212. Thus, during or even before reading of the protected data from the NFC-chip, the terminal may already start clone detection communication 230 with the server. This communication may comprise information from the partially received protected data.

After the communication 230 for clone detection between the terminal and the server, the server communicates 240 with the NFC-chip via the terminal completing the clone detection protocol.

This sequence diagram splits the functionality of the server according to the prior art in a terminal and server according to the invention. The terminal is close to the NFC-chip as required by the NFC-communication. The server may be arranged at a distance from the terminal. The network between the server and the terminal may comprise several network hobs and several types of network. In a system, set-up according to this sequence diagram, the server may be placed at a location allowing the server to be trusted in a simpler way. For example, the server may be located in a server-room under controlled conditions. The server may further be shared serving multiple terminals preventing the need for a trusted server per terminal. The terminal, close to the NFC-chip, may be untrusted or partially trusted hence requiring minimal security measures. Hence, the sequence diagram provides the advantage of simplified communication, such as a simpler sequence of communication, with an NFC-chip.

A first delay d201 is defined between the completion of the protected data communication 212 and the server communicating with the NFC-chip 240. A second delay d202 is defined between the clone detection communication 230 between terminal and the server and the clone detection communication 240 between the NFC-chip and the server via the terminal. The server may process the communication from the terminal parallel to the terminal communicating with the NFC-chip. The first delay d201 is shortened as the second delay d202 in the clone protection protocol runs parallel to the first delay. As these delays run parallel, this sequence diagram, defining the behaviour of the terminal and server according to the current invention provide the advantage of minimizing or even preventing the chance on a protocol time-out or the NFC-chip running out of energy. Furthermore, the network between may introduce jitter, delays, round-trip-delays and loss of data requiring retransmissions. This sequence diagram minimizes these influence by shortening the first delay d201. Hence, communication according to this sequence diagram provides the advantage of increasing the reliability of the NFC-communication between the NFC-chip and the terminal.

Access to the data may be protected by an access control. The NFC-communication may conform to a version of the ICAO Doc 9303 or ISO18013 protocol. The access control mechanism may conform to a version of the BAC or PACE protocol.

Figure 3:
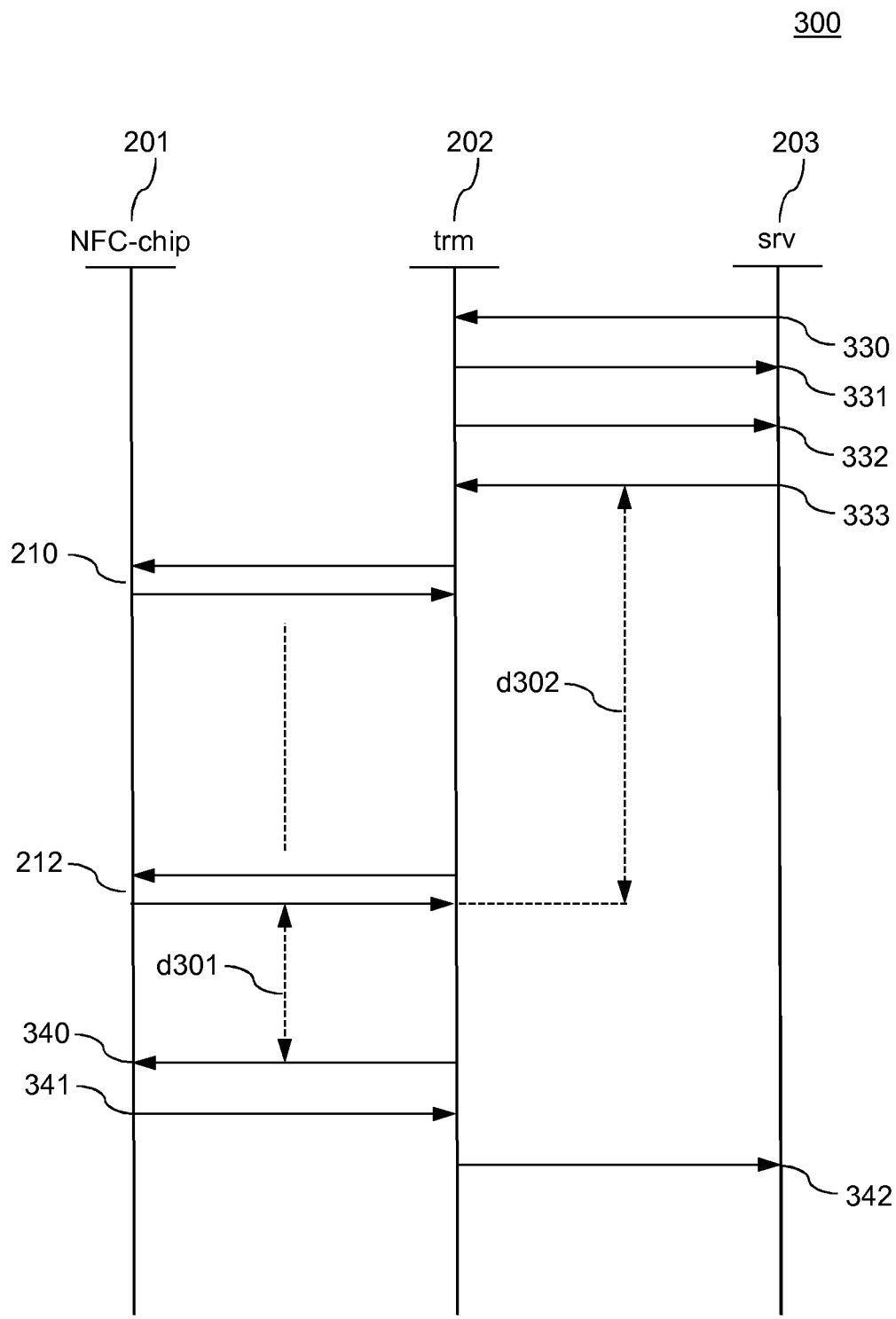
FIG. 3 schematically shows a sequence diagram according to an embodiment of the current invention.

FIG. 3 schematically shows a sequence diagram 300 according to an embodiment of the current invention. The sequence diagram 300 is a further detailing of the sequence diagram 200 in FIG. 2. The sequence diagram comprises an NFC-chip 201, a terminal 202 and a server 201 according to the current invention as actors.

The server generates challenges used as seed or start for the clone detection protocol. Challenges are generated independent of the NFC-chip. Hence, the challenge may be used by any terminal communicating to any NFC-chip. Therefore, the challenges may already be transferred to the terminal before or during that the NFC-communication with the NFC-chip starts. Hence, the second delay d302 is independent of any NFC-communication.

Optionally, the server may request 330 the amount of challenges present on the terminal. The terminal may reply 331 with the amount of challenges present on the terminal from that particular server. The terminal may have multiple challenges stored for future NFC-communication. The terminal may have multiple challenges from multiple servers for future NFC-communication. Alternatively, the terminal may indicate the amount of challenges stored, without a request from the server. Alternatively, the terminal may request 332 for a new challenge or multiple new challenges from the server. The server generates a challenge or challenges and provides 333 this challenge or these challenges to the terminal. This providing 333 may be done without the server keeping track of the challenges present on the terminal or with one of the previous mentioned exchanges for managing the amount of challenges on the terminal. A challenge present on the terminal and not used before a certain time-out may become obsolete. Multiple combinations of messages are foreseeable by the skilled person. The one or more challenges on the terminal may be stored in a storage, such as a stack or pipe.

As the challenges are present on the terminal, after the terminal has completed reading protected data communication, the challenges may be transmitted from the terminal to the NFC-chip with a first delay d301, which may be minimal. The second delay d302 has no influence on this delay. This embodiment provides the advantage of reducing or preventing influence of the second delay d302. Furthermore, the terminal is simplified and the server may be in a controlled environment, as discussed throughout this application.

Figure 4:
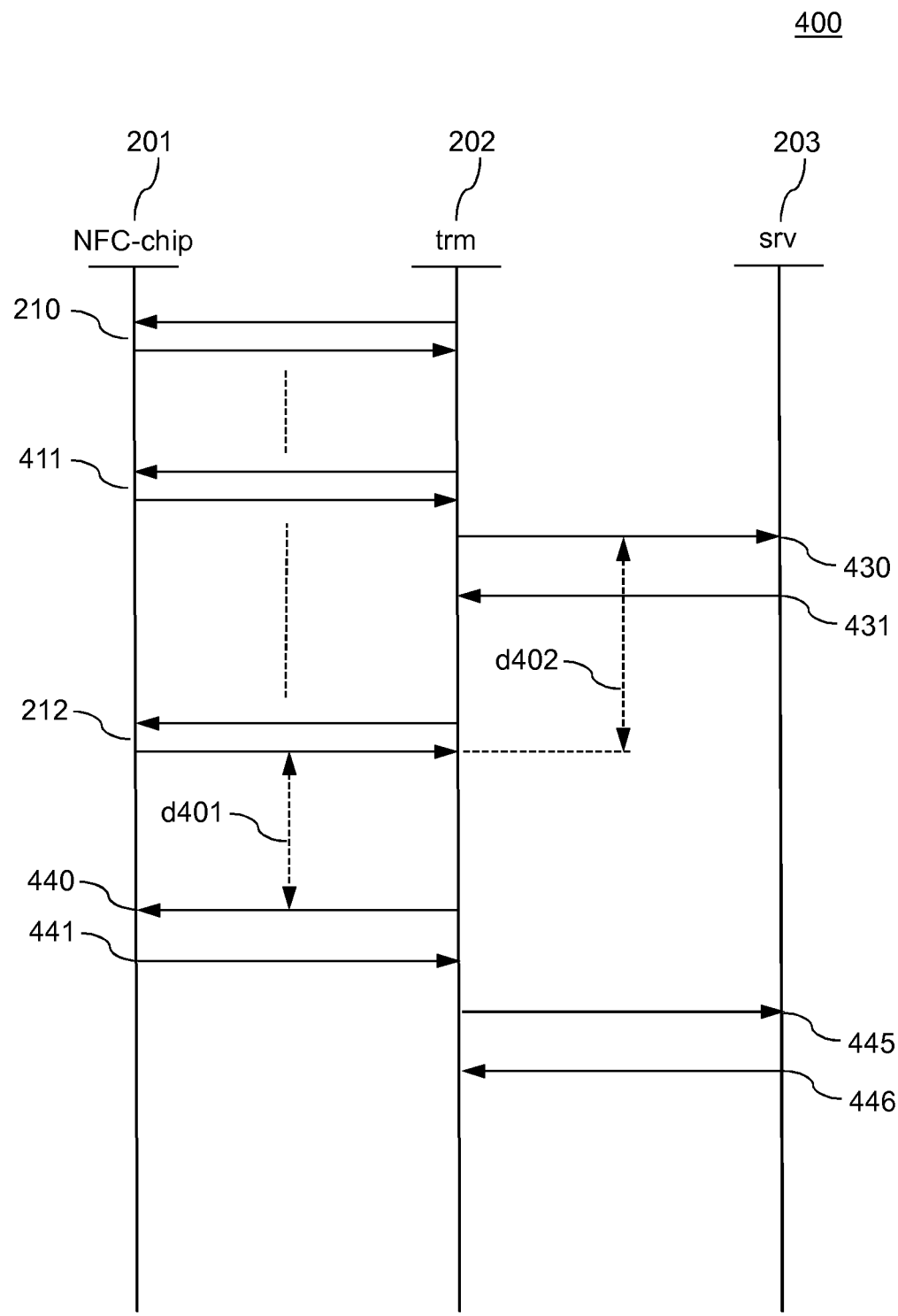
FIG. 4 schematically shows a sequence diagram according to an embodiment of the current invention.

FIG. 4 schematically shows a sequence diagram 400 according to an embodiment of the current invention. The sequence diagram 400 is a further detailing of the sequence diagram 200 in FIG. 2. The sequence diagram comprises an NFC-chip 201, a terminal 202 and a server 201 according to the current invention as actors.

The server generates challenges used as seed or start for the clone detection protocol. The protected data is transferred from the NFC-chip to the terminal during the NFC-communication. The NFC-chip comprises a chip key pair. This chip key pair comprises a public chip key and a private chip key. The public chip key is part of the protected data and is thus transferred 411 during this communication.

The communication 430 of the public chip key to the server may be seen as the start of the clone detection. This communication may take place before the completion 212 of reading protected data, as indicated with the second delay d402.

The server comprises a server key pair. This server key pair comprises a public server key and a private server key. Preferably, the server communicates 431 the public server key and a challenge to the terminal before the completion of reading protected data.

The terminal may transfer 440 the challenge and the public server key to the NFC-chip as part of the NFC-communication after the completion 212 of the transfer of the protected data with a first delay d401. As the second delay d402 is preferably completely before the completion 212 of the transfer, the second delay does not increase the first delay d401. Thus, the first delay is decreased or minimized.

The NFC-chip responds 441 with a challenge response to the terminal. The terminal in response communicates 445 the challenge response to the server. The server may now verify the genuineness of the NFC-chip based on a shared secret. The shared secret at the server is based on the private server key and the public chip key. The shared secret at the NFC-chip is based on the private chip key and the public server key. The shared secret may be derived with the use of a Diffie-Hellman key exchange or a Diffie-Hellman key exchange variation.

Figure 5:
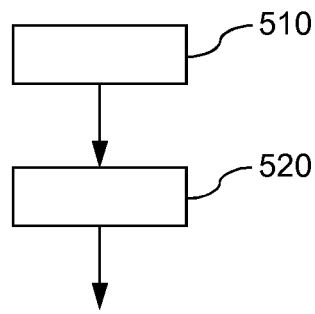
FIG. 5 schematically shows a method for a terminal according to an embodiment of the invention.

FIG. 5 schematically shows a method 500 for a terminal according to an embodiment of the invention. The method starts with the step of obtaining 510 protected data from the NFC-chip. The method continues with the step of forwarding 520 communication between the NFC-chip and a server for verifying genuineness of the NFC-chip. This method may be implemented by a terminal conforming to the communication as specified in the sequence diagram of FIG. 2, 3 or 4.

Figures 6A, 6B:
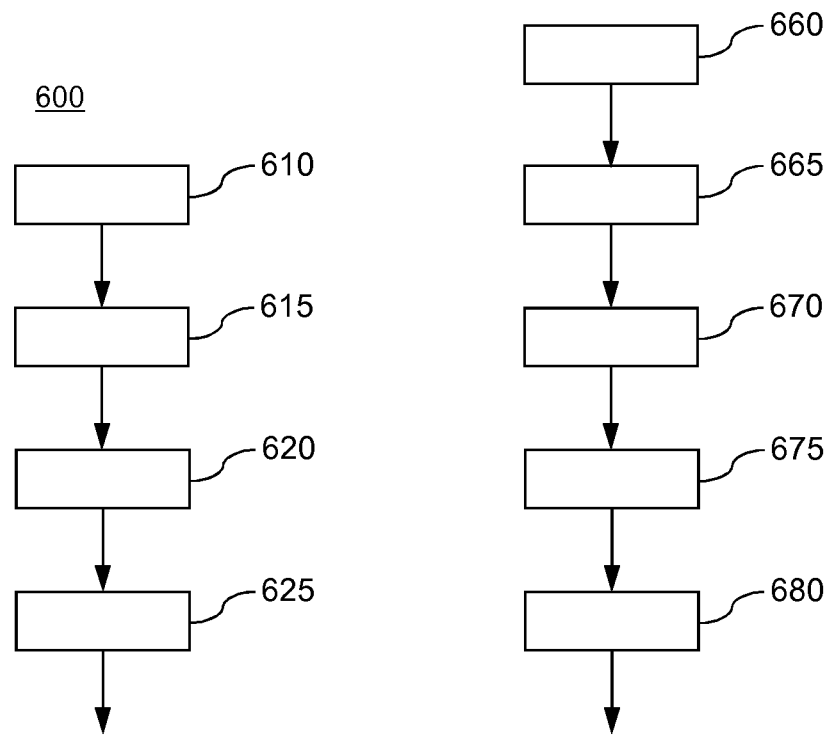
FIG. 6a schematically shows a method for a server according to a first embodiment of the invention.
FIG. 6b schematically shows a method for a server according to a second embodiment of the invention.

FIG. 6a schematically shows a method for a server 600 according to a first embodiment of the invention. The method starts with the step of tracking 610 the amount of challenges provided by the server to a terminal communicating with the NFC-chip. The method continues with the step of receiving 615 a challenge response to a challenge from the server from the terminal. The method continues with the step of verifying 620 genuineness of the NFC-chip based on the challenge response and the challenge. The method continues with the step of providing 625 a newly generated challenge to the terminal based on the tracking step. This method may be implemented by a server conforming to the communication as specified in the sequence diagram of FIG. 2 or 3.

FIG. 6b schematically shows a method for a server 650 according to a second embodiment of the invention. The method starts with the step of receiving 660 a copy of protected data on the NFC-chip. The method continues with the step of verifying 665 the protected data with a digital signature comprised in the protected data. The method continues with the step of receiving 670 a public chip key from a key chip pair on the NFC-chip for basing a challenge on the public chip key. The method continues with the step of transmitting 675 the challenge and a public server key from a key server pair from the server. The method continues with the step of receiving 680 a challenge response from the NFC-chip, wherein the challenge response is based on a shared key based on the public server key and a private chip key of the chip pair, wherein the step of receiving the public chip key is initiated before the step of verifying the protected data. This method may be implemented by a server conforming to the communication as specified in the sequence diagram of FIG. 2 or 4.

Alternatively, the method schematically shown in FIG. 6b may be executed in an alternative order or split in more sub-steps. As an example, the method may start with the step of partially receiving protected data on the NFC-chip. The protected data may be received up to and including the public chip key 670. The method continues with the step of transmitting 675 the challenge and a public server key from a key server pair from the server. The method continues with the step of receiving 680 a challenge response from the NFC-chip, wherein the challenge response is based on a shared key based on the public server key and a private chip key of the chip pair, wherein the step of receiving the public chip key is initiated before the step of verifying the protected data. The method continues with the step of receiving 660 the rest of the protected data on the NFC-chip. The method continues with the step of verifying 665 the protected data with a digital signature comprised in the protected data. This method may be implemented by a server conforming or partly conforming to the communication as specified in the sequence diagram of FIG. 2 or 4.

Figure 7:
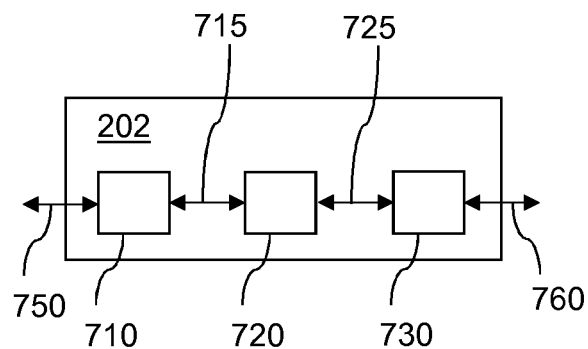
FIG. 7 schematically shows a terminal according to an embodiment of the invention.

FIG. 7 schematically shows a terminal 202 according to an embodiment of the invention. The terminal comprises a communication unit 730, a transceiver 710 and processing means 720.

The communication unit is configured for communicating 760 with a server verifying genuineness of an NFC-chip of a user identification document. The transceiver is configured for communicating 750 with the NFC-chip. This communication may be labelled NFC-communication. The processing means are configured for obtaining protected data of the NFC-chip via the transceiver. Processing means are configured for obtaining protected data of the NFC-chip and forwarding communication between the NFC-chip and the server, wherein communication is forwarded before the protected data is obtained.

This terminal may conform to the communication as specified in the sequence diagram of FIG. 2, 3 or 4 or in the method of FIG. 5.

Figure 8A:
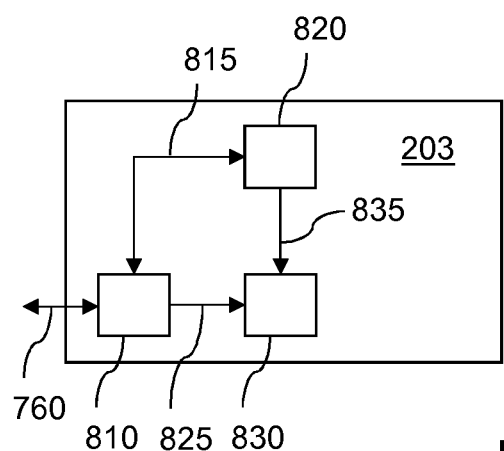
FIG. 8a schematically shows a server according to a first embodiment of the invention.

FIG. 8a schematically shows a server 203 according to a first embodiment of the invention. The server comprises a communication unit 810, a challenge storage 820 and a verification unit 830.

The communication unit is configured for communicating 760 with a terminal providing data for verifying genuineness of an NFC-chip of a user identification document. The challenge storage is configured for tracking challenges associated with a terminal. The challenge storage communicates 815 information concerning the challenges with the communication unit. This communication may comprise data necessary for messages between terminal and server as specified in FIG. 3. The challenge storage may comprise a challenge generator and challenge management unit, which are not shown in the figure. The verification unit is configured for verifying genuineness of an NFC-chip based on a challenge response 825 from the communication unit and the associated challenge 835 from the challenge storage.

This server may conform to the communication as specified in the sequence diagram of FIG. 2 or 3 or in the method of FIG. 6a.

Figure 8B:
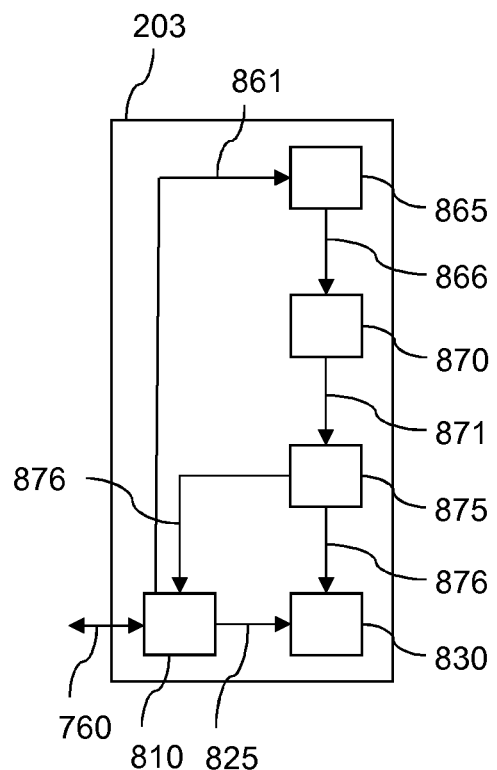
FIG. 8b schematically shows a server according to a second embodiment of the invention.

FIG. 8b schematically shows a server 203 according to a second embodiment of the invention. The server comprises a communication unit 810, a protected data storage 865, a signature verification unit 870, a challenge generator 875 and a verification unit 830.

The communication unit is configured for communicating 760 with a terminal providing data for verifying genuineness of an NFC-chip of a user identification document. The protected data storage is configured for storing a received 861 copy of protected data on an NFC-chip of a user identification document. The signature verification unit is configured for verifying the protected data using a digital signature comprised in the protected data. The verification unit receives the protected data from the protected data storage. The verification unit may receive the digital signature from an external certificate server. This certificate server may be connected to the network also carrying the terminal-server communication 760 or may be connected to the server via a separate communication network. The digital signatures may also be kept local to the server.

The server generates challenges used as seed or start for the clone detection protocol. The protected data is transferred from the NFC-chip to the terminal during the NFC-communication.

The NFC-chip comprises a chip key pair. This chip key pair comprises a public chip key and a private chip key. The public chip key is part of the protected data and is thus transferred 861 during this communication.

The communication 430 of the public chip key to the server may be seen as the start of the clone detection. This communication may take place before the completion 212 of reading protected data, as indicated with the second delay d402.

The server comprises a server key pair. This server key pair comprises a public server key and a private server key. Preferably, the server communicates 431 the public server key and a challenge to the terminal before the completion of reading protected data.

The public chip key is provided 871 to the challenge generator by the signature verification unit or alternatively by the protected data storage. Wherein, in the latter case, the verification unit has to signal the protected data comprises a correct signature or not. The challenge generator is configured for generating a challenge based on a public chip key from a key chip pair on the NFC-chip. The challenge is transmitted 876 to communication unit for transmission to the NFC-chip.

The verification unit is configured for verifying genuineness of the NFC-chip based on a challenge response and the associated challenge. The verification unit receives a challenge response 825 from the communication unit. The verification unit further receives 835 an associated challenge from the challenge generator. The challenge generator may comprise a storage for storing the separate challenges. The challenges may be associated via a session ID also present in the challenge response.

This server may conform to the communication as specified in the sequence diagram of FIG. 2 or 4 or in the method of FIG. 6b.

It should be noted that the figures are purely diagrammatic and not drawn to scale. In the figures, elements which correspond to elements already described may have the same reference numerals.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Figure 9:
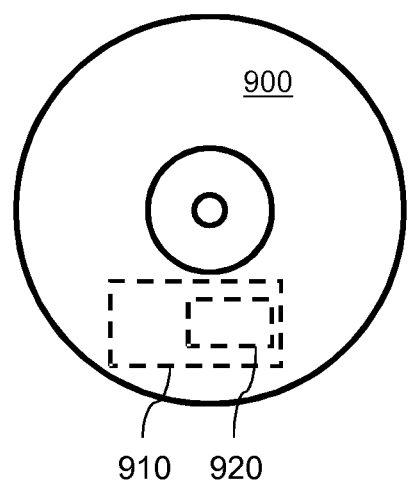
FIG. 9 schematically shows an embodiment of a computer program product, computer readable medium and/or non-transitory computer readable storage medium according to the invention.

FIG. 9 schematically shows an embodiment of a computer program product, computer readable medium and/or non-transitory computer readable storage medium 900 having a writable part 910 including a computer program 920, the computer program including instructions for causing a processor system to perform a method according to the invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Examples, embodiments or optional features, whether indicated as non-limiting or not, are not to be understood as limiting the invention as claimed.

The invention claimed is:

1. A method for communication with an NFC-chip of a user identification document, comprising the steps of:
   a terminal, trusted to do access control and adapted for carrying out the access control, the terminal obtaining protected data from the NFC-chip by communicating with the NFC chip, wherein the obtaining comprises the step of verifying the integrity of the protected data;
   a server verifying genuineness of the NFC-chip communicating via the terminal, wherein the step of verifying genuineness of the NFC-chip is initiated before the terminal completes the step of obtaining the protected data, and wherein the step of verifying genuineness of the NFC-chip is completed after the terminal initiates the step of obtaining the protected data, wherein the terminal is trusted to do clone-detection protocol execution and adapted for executing said clone-detection protocol, but wherein the terminal is untrusted to do active authentication and passive authentication.

2. The method according to claim 1, wherein verifying genuineness of the NFC-chip comprises:
   the terminal forwarding a chip public key from a chip key pair on the NFC-chip to the server for basing a challenge on the chip public key;
   the terminal receiving a challenge and a server public key from a server key pair from the server, wherein the challenge is based on the chip public key that was forwarded by the terminal to the server;
   the terminal transmitting the challenge and the server public key to the NFC-chip; and the terminal forwarding a response to the challenge from the NFC-chip to the server, wherein the challenge response is based on a shared key based on the server public key and a chip private key of the chip key pair.

3. A method for a terminal communicating with an NFC-chip of a user identification document, comprising the steps of:
obtaining protected data from the NFC-chip, by communicating with the NFC-chip, wherein the obtaining comprises the step of verifying the integrity of the protected data; and
forwarding communications between the NFC-chip and a server for verifying genuineness of the NFC-chip, wherein said forwarding of communications for verifying genuineness of the NFC-chip is initiated after said obtaining of the protected data is initiated and before completing the step of obtaining the protected data, and wherein the step of forwarding communications is completed after the step of obtaining the protected data is initiated,
wherein the terminal is adapted and trusted to do access-control and clone-detection protocol execution but untrusted to do active authentication and passive authentication.

4. The method according to claim 3, wherein the forwarding communication between the NFC-chip and the server comprises:
forwarding a chip public key from a chip key pair on the NFC-chip to the server for basing a challenge on the chip public key;
receiving the challenge and a server public key from a server key pair from the server, wherein the challenge is based on the chip public key that was forwarded by the terminal to the server;
transmitting the challenge and the server public key to the NFC-chip; and
forwarding the response to the challenge from the NFC-chip to the server, wherein the response to the challenge is based on a shared key based on the server public key and a chip private key of the chip key pair.

5. A terminal comprising:
a communication unit configured for communicating with a server, which server is configured for verifying genuineness of an NFC-chip of a user identification document;
a transceiver configured for communicating with the NFC-chip; and
processing means configured for obtaining protected data of the NFC-chip, said obtaining comprising, using the transceiver, receiving protected data from the NFC chip and comprising, by the processing means, verifying the integrity of the protected data, the processing means further being configured for, using the transceiver and the communication unit, forwarding communications between the NFC-chip and the server for verifying genuineness of the NFC-chip, wherein said forwarding of communications for verifying genuineness of the NFC-chip is initiated after said obtaining of the protected data is initiated, wherein said forwarding of communications is initiated before obtaining the protected data is completed, and wherein said forwarding of communications is completed after obtaining the protected data is initiated,
wherein the terminal is adapted to and trusted to do access control and clone-detection protocol execution but untrusted to do active authentication and passive authentication.

6. The terminal according to claim 5, comprising a challenge storage configured for temporarily storing a challenge on the terminal, which challenge is used for determining the genuineness of the NFC-chip.

7. A computer program product comprising a non-transitory computer readable medium having computer readable code embodied therein, the computer readable code being configured such that, on execution by a suitable computer or processor, the computer or processor is caused to perform the method of claim 1.

8. The method according to claim 1, wherein the step of verifying the genuineness of the NFC chip is initiated after the step of obtaining protected data from the NFC chip is initiated.

9. The method according to claim 1, wherein the step of verifying the genuineness of the NFC chip is initiated before the step of obtaining protected data from the NFC chip is initiated.

10. The method according to claim 1, comprising, by the terminal, executing the clone-detection protocol.

* * * * *